United States Patent [19]
Soto

[11] 3,884,747
[45] May 20, 1975

[54] MACHINE FOR SIZING AND PROCESSING DRAPERY MATERIAL

[76] Inventor: Enrique Soto, 514 Orange Grove Ave., South Pasadena, Calif. 91030

[22] Filed: Aug. 22, 1973

[21] Appl. No.: 390,332

Related U.S. Application Data

[63] Continuation-in-part of Ser. No. 841,246, July 14, 1969, abandoned, and a continuation-in-part of Ser. No. 155,022, June 21, 1971, Pat. No. 3,795,565.

[52] U.S. Cl. ............... 156/467; 226/187; 226/189; 156/378; 156/465; 156/522; 156/530
[51] Int. Cl. ............................................. B29d 31/00
[58] Field of Search ......................... 156/200–202, 156/216, 259, 267, 269, 271, 306, 313, 461, 465, 467, 483, 485, 522, 526, 530, 554, 555; 19/106 R, 157; 26/1, 57 R, 57 E, 57 C; 226/189, 187; 271/172–174; 112/141–143, 147, 121 R

[56] References Cited
UNITED STATES PATENTS

| | | | |
|---|---|---|---|
| 1,507,342 | 9/1924 | Davis | 156/267 |
| 2,501,873 | 3/1950 | Oliver | 226/187 |
| 2,737,700 | 3/1956 | Thompson | 26/1 |
| 3,012,603 | 12/1961 | Newsome et al. | 156/465 |
| 3,068,137 | 12/1962 | Seubert | 156/201 |
| 3,463,482 | 8/1969 | Baron et al. | 112/147 |
| 3,534,954 | 10/1970 | Lynch | 112/147 |
| 3,631,826 | 1/1972 | Morgan | 112/141 |
| 3,654,015 | 4/1972 | Purcell et al. | 156/465 |
| 3,795,565 | 3/1974 | Soto | 156/465 |

*Primary Examiner*—Clifton B. Cosby
*Assistant Examiner*—John E. Kittle
*Attorney, Agent, or Firm*—Herzig & Walsh

[57] ABSTRACT

A measured length of drapery material is carried through the machine and through a processing appliance at one end of the machine. The machine has a tabling surface with a moving portion provided by a rotary drum which moves the fabric. The fabric is tumbled (moved or transported) from a holder at the entrance side of the machine through it into a holder at the exit side of the machine. The material passing through the machine comprises several widths seamed together. An accurately measured total width is held by pressure rollers over the tabling surface, the measured width being the accurately measured length of a drape being formed, i.e., the material is "sized." At the end of the machine, the edge of the material which will be the top edge of the drape passes under and then is folded over a plate in an accurate amount, the excess materail being continuously cut off by a cutter. A strip of stiffening buckram leads from a roll underneath the plate into a position between the folded over edge parts. The stiffening material is impregnated with adhesive. A heated roller is provided which is lowered to apply heat to the adhesive to bond folded edges and stiffening material together.

10 Claims, 13 Drawing Figures

MACHINE FOR SIZING AND PROCESSING DRAPERY MATERIAL

This application is a continuation-in-part of application Ser. No. 841,246 filed on July 14, 1969 now abandoned and of application Ser. No. 155,022 filed on June 21, 1971 now U.S. Pat. No. 3,795,565.

SUMMARY OF THE INVENTION

The invention is a machine for processing fabric material, particularly drapery material from which drapes are made. The machine is one that performs the process known in the trade as tabling as referred to hereinafter by tumbling (passing or transporting) the material over a tabling surface having a moving portion. Tabling of material involves the step of accurately sizing the fabric for the length which the finished drape is to have, i.e., measuring and forming to the correct length. Basically, the machine provides a relatively wide tabling surface over which the material is passed and on which it is held down by pressure rollers. The tabling surface embodies a rotary drum providing a moving surface for transporting, i.e., tumbling the fabric. The machine is provided at one end part of said surface with mechanism for processing the edge of a drapery material which is the edge which becomes the top of the finished drape.

BACKGROUND OF THE INVENTION

The machine is one that makes possible processing of drapery material with a greatly reduced amount of hand labor and space requirements which have been characteristic of the prior art up to date. The invention will be best understood from some elucidation of processing of drapery material as conventionally done in the prior art.

Drapes must be fabricated accurately to be of the correct length so as not to drag on the floor and are then processed to receive a drapery rod or fixture at the top and are pleated. The drapery material originally comes in fixed widths from bolts of materials. Several widths are sewed together to produce material of the correct width for drapes. As presently done, the drapery material is handled, that is, tabled on relatively large tables which require a great amount of space in processing areas. Typically, such areas are provided with manually operated clamps at the end of the table for clamping a limited width of material, that is, a width corresponding to one of the original widths. The operator at the foot of the table measures the drapery for the correct length and then folds an edge portion inwardly and creases the fold with an iron. The strip of stiffening material such as backram is then manually inserted between the folded portions and then the laminations are manually bonded by means of an iron. The operator operates on only one of the individual widths at a time; and after finishing one width, the material is shifted and another width clamped and the processing repeated. As can be observed, the equipment requires a very large amount of space in the processing area; the work is slow and tedious and can only be done at a slow rate manually by the personnel; and the equipment is unweidly and cumbersome.

Known prior art includes U.S. Pat. Nos. 1,507,342; 2,529,859; 2,937,689; 3,044,534; 3,143,456; 3,012,603; 3,102,305; 3,184,798; 3,463,482; 3,534,954; and 3,654,015.

The herein invention as referred to briefly in the foregoing and described in detail hereinafter as to a preferred exemplary embodiment possesses characteristics such that all of the enumerated deficiencies are overcome and as well, a number of additional advantages are achieved. A primary object of the invention is to overcome the aforesaid deficiencies and to realize the additional advantages.

A specific object of the invention is to eliminate the need for the large space-consuming tabling surface areas required in the prior art.

Another object is to realize the foregoing object by way of utilizing a relatively small surface having a rotary drum over which the material is tumbled or transported rather than utilizing a large table surface area.

Another object is to make possible the simultaneous and continuous processing of multiple widths of drapery forming a complete drape of accurately measured length.

Another object is to simplify and make more accurate the sizing of the drapery means provided as a part of the machine. Another object is to realize this purpose by means of a tabling surface of limited size having an intermediate rotary drum for moving the drapery fabric from one side to the other.

Another object is to simplify and make possible the continuous processing of the top of the drape, including the folding over of the top edge; applying of the stiffening material; and bonding together the folded over edges and stiffening material.

Another object is to provide improved automated means for performing the folding of the drapery fabric and stiffening material, including means for pressuring and activating adhesive.

Another object is to speed up the processing of the drapery material while at the same time reducing the number of personnel required and the amount of space required.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
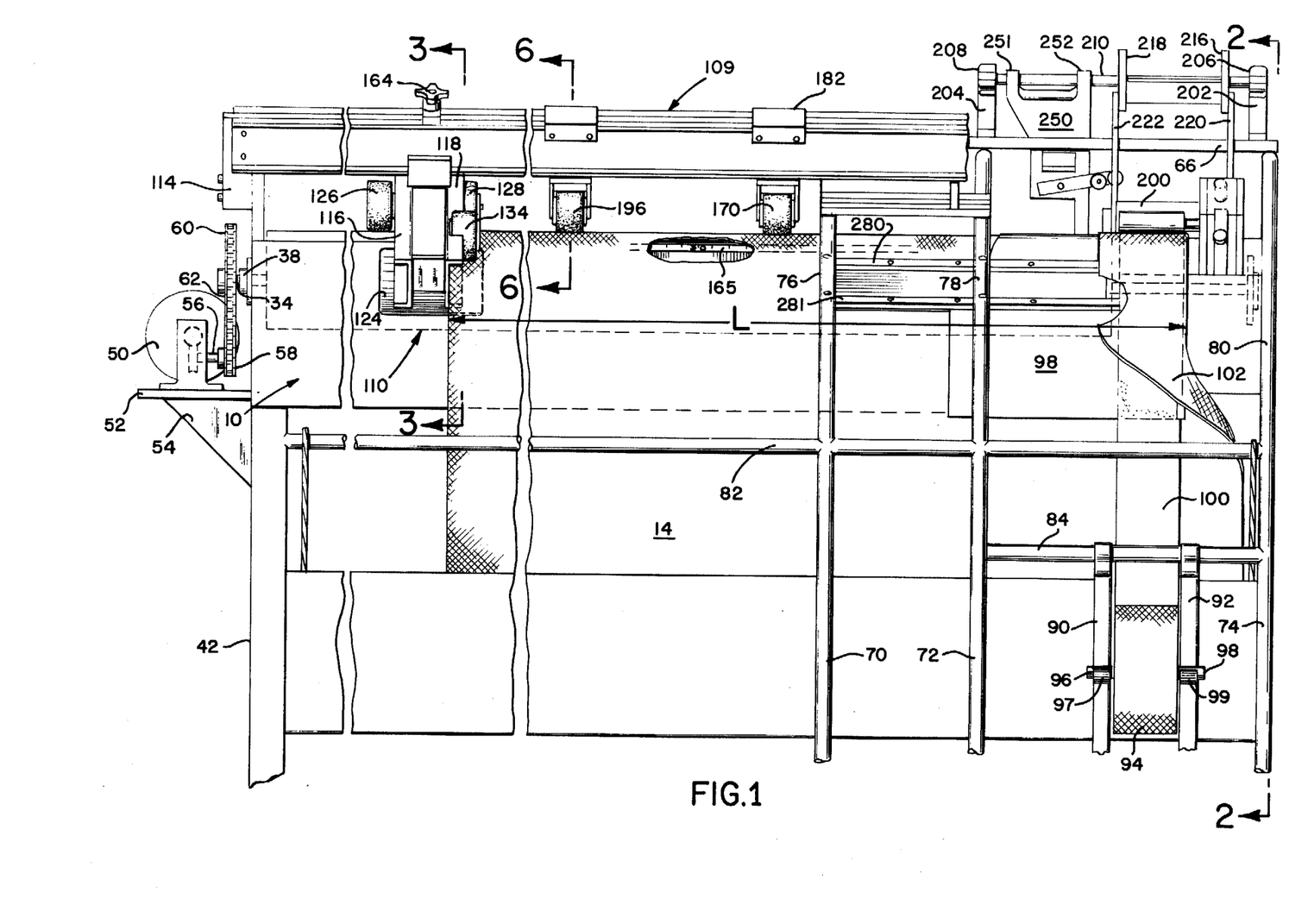
FIG. 1 is a front elevational view of the machine of the invention.
Figure 2:
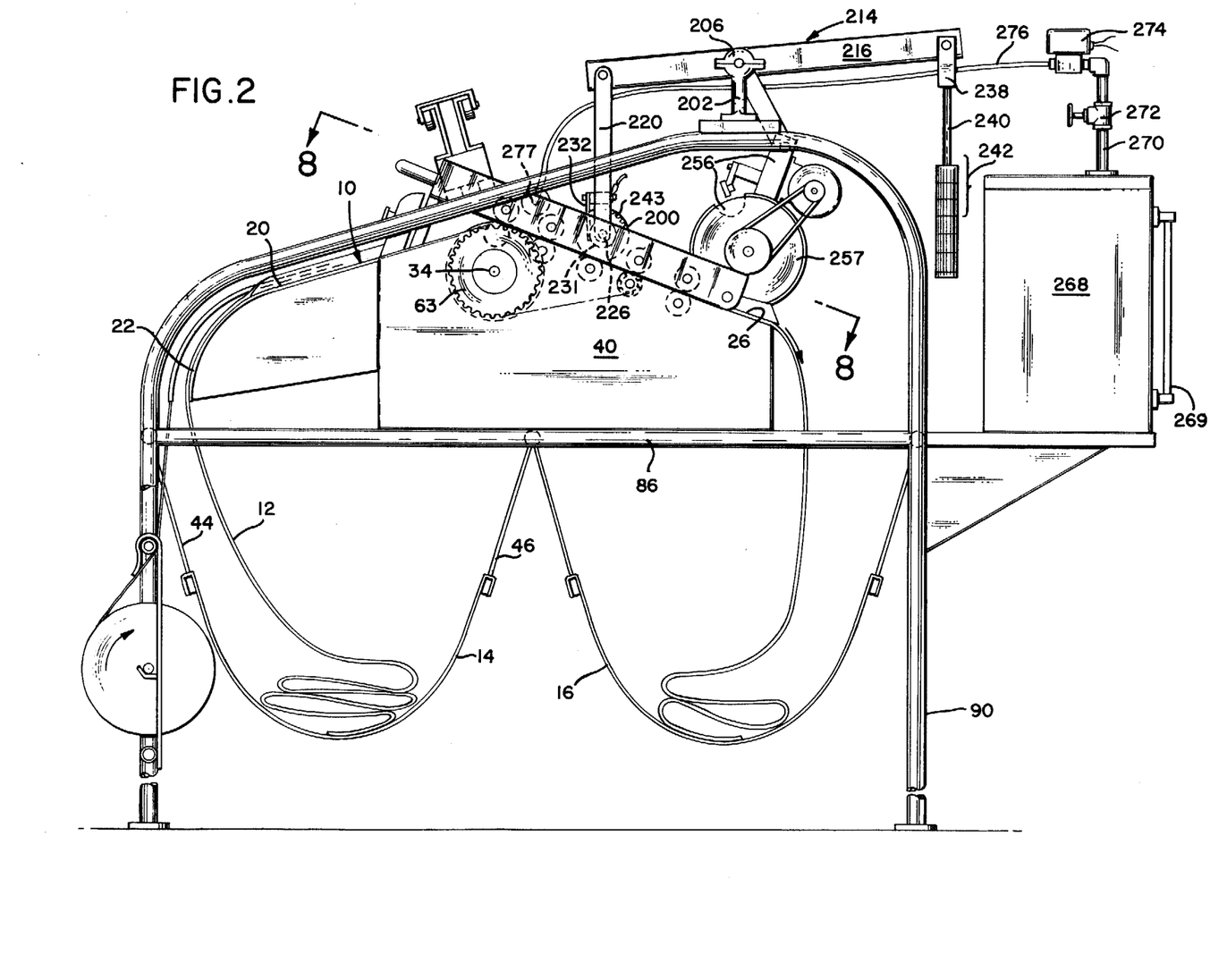
FIG. 2 is a view taken along the line 2—2 of FIG. 1.
Figure 3:
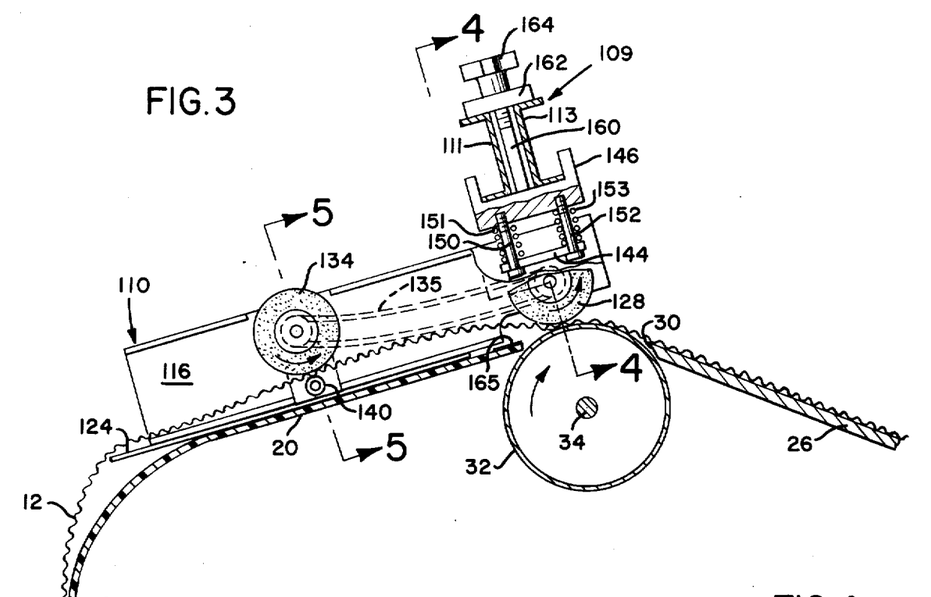
FIG. 3 is a detail view taken along the line 3—3 of FIG. 1.

The general organization of the machine will best be appreciated from FIGS. 1 and 2, FIG. 1 being a front view of the machine and FIG. 2 being a view taken along the line 2—2 of FIG. 1. The operator occupies a position in the front of the machine for applying the edge or border stiffener at the right end of the machine as seen in FIG. 1. In operation, as will be explained presently, the drapery fabric is tumbled, that is, passed or carried from one basket or fabric holder over the platform or table and the rotating drum into another basket or holder on the other side of the tabling surface. The table or platform surface over which the fabric passes is designated by numeral 10 and is of a particular shape or configuration. The shape or configuration of the top surface may best be appreciated from FIGS. 2 and 3. Fabric passes over the tabling surface from left to right as seen in FIGS. 2 and 3. The drapery material is designated at 12 and moves from a holder or basket 14 on the entrance side to a holder or basket 16 on the other side as will be described more in detail presently. On the entering side, the tabling surface includes an inclined part 20, the leftward part of which is of a rounded contour as designated at 22. This surface may be formed of any suitable material which can be formed into the contour as described, such as plastic or otherwise. On the other side of the tabling surface beyond the processing mechanism is an inclined surface 26 which may be formed of any suitable material. There is a gap 30 in FIG. 3 between inclined surfaces 20 and 26. Numeral 32 designates an elongated cylindrical drum mounted on shaft 34, the drum being in a position such that its upper part extends into gap 30. As may been seen, drapery fabric 12 leads up over the contoured inlet surface, over the upper part of rotating drum 32, and on to inclined surface 26 at the back of the machine. It will be understood that by reason of the contact between the periphery of drum 32 and fabric 12, the drapery material will be continually moved or caused to traverse (tumbled) from left to right as will be described more in detail presently. Rotating drum 32 is exemplary of a preferred means for moving the drapery material, that is to cause it to traverse the tabling surface, although other alternative means may be employed.

Shaft 34 is journalled in bearing 38 and in a similar bearing at the other end as may be seen in FIG. 1. At the end of the machine is a housing 40 having a shape as may be seen in FIG. 2, as will be referred to again more in detail presently. A supporting frame structure is provided underneath the tabling structure which is supported by four supporting legs, one of which is designated 42 in FIG. 1, the others not being shown.

Basket 14 is made from fabric material, the edges or ends of which are suspended underneath the frame structure of the machine by suspension members 44 and 46. Basket 16 is of similar construction and is similarly suspended.

Drum 32 is driven by motor 50 suitably supported on platform 52 supported by way of bracket structure 54. Motor 50 drives a shaft 56 which drives shaft 34 of drum 32 by way of sprocket wheels 58, 60, and sprocket chain 62. Shaft 34 is journalled at the opposite end of the machine. It extends beyond housing 40 and carries sprocket wheel 63 which will be referred to again presently.

At the right end of the machine, supported at a level above that of the tabling surface is a platform 66 which provides support for the heated roller which seals the buckram sealing strip after application and the rotary cutter for cutting off the excess fabric material as will be described. Platform 66 is supported by way of tubular support columns having vertical portions at the front of the machine designated at 70, 72, and 74. These columns have inclined portions 76, 78, and 80 in FIG. 1 which are positioned over tabling surface 10. Numeral 82 designates a transverse brace member at the front of the machine. Numeral 84 designates a transverse tubular brace member extending between column members 72 and 74 as shown. Numeral 86 designates a fore and aft brace member at the end of the machine. Tubular column 74 has a vertical part 90 at the back of the machine as may be seen in FIG. 2, the other tubular columns 70 and 72 having similar vertical portions at the back of the machine.

Numerals 90 and 92 designate vertical spaced support strap members positioned between columns 72 and 74 and between them is a roll of stiffening material, such as buckram 94, journalled on arbors 96 and 98 held in hooked end parts 97 and 99 of straps 90 and 92. A strip of stiffening material is designated at 100. The edge part of the fabric material 102 is folded over the stiffening material and sealed or bonded thereto by a mechanism which will be described more in detail presently.

The drapery material is accurately measured and formed (sized) and guided as it is passed (tumbled) over the tabling surface. It is held down during its passage. The machine as described provides an alternative to a large tabling surface for tabling and sizing. In the past, sizing of the drapery has been a very difficult function for manual operators. The sizing and guiding mechanism is best shown in FIGS. 1 through 7. Supported over the tabling surface and substantially over drum 32 is a guide assembly designated generally at 110 which is supported from guide channel 109. Guide channel member 109 is formed of two channel members 111 and 113 as may be seen in FIG. 3. Channel members 111 and 113 are fastened together in spaced relationship by way of fasteners or bracket members not shown, and is supported at its left end by bracket 114. At the bottom of guide assembly 116 there is attached flat guide plate 124. At the end of the guide assembly 110 are two rollers 126 and 128 which may be made of rubber or composition material. These rollers are journalled on suitable shafts 129 carried by channel members 116 and 118 (see FIGS. 3 and 4). On shaft 129 is sprocket wheel 130 which will be referred to again presently.

Figures 5, 6:
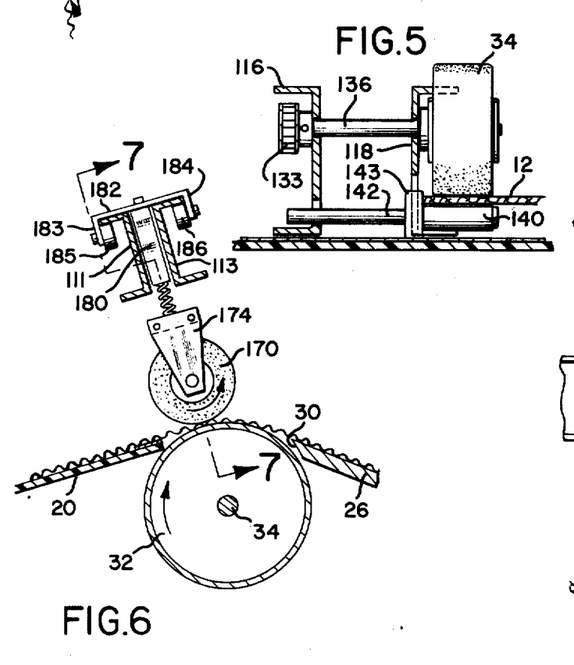
FIG. 5 is a sectional view taken along the line 5—5 of FIG. 3.
FIG. 6 is a partial sectional view taken along the line 6—6 of FIG. 1.
Figure 7:
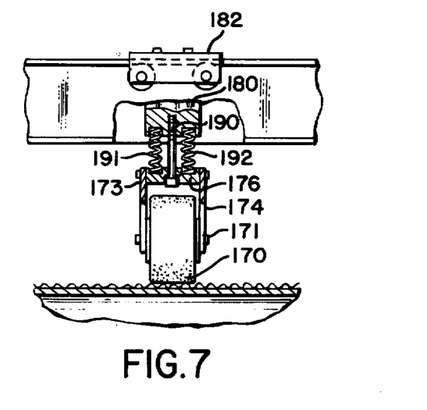
FIG. 7 is a partial sectional view taken along line 7—7 of FIG. 6.

Numeral 134 designates a similar roller member on a shaft 136 carried by channel members 116 and 118 in a position as may be seen in FIGS. 3 and 5. Below roller member 134 is a smaller roller member 140 on shaft 142 carried by channel members 116 and 118, the spacing between these rollers being relatively close to accommodate drapery material 12 which passes between them as shown in FIG. 3. As may be seen, channel member 118 provides an accurate guide for the left edge of the drapery material which moves in a manner as shown in FIG. 3. Guide assembly 110 can be accurately positioned for sizing the drapery as will be described. Shaft 142 is carried by block 143 which has spring biased sliding engagement relative to member 118 to accommodate different thicknesses of fabric.

Figure 4:
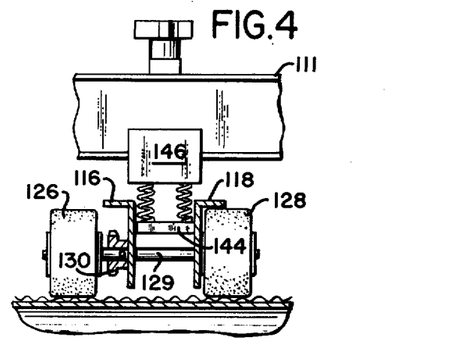
FIG. 4 is a sectional view taken along the line 4—4 of FIG. 3.

As may be seen in FIGS. 3 and 4, there is a brace member 144 positioned between channel members 116 and 118. Numeral 146 designates a U or channel shaped support block which is attached to brace member 144 by bolts 150 and 152 with coil springs 151 and 153 positioned between members 144 and 146, the bolts passing through them so that support block 146 is flexibly mounted. The recess in block 146 receives or engages the flanges at the bottom of channel members 111 and 113. Support block 146 is adjustably secured to channel members 111 and 113 by way of bolt 160 which extends between the channel members and a spacer collar 162 with an adjustable knob 164 on its end. Thus, as may be seen, guide assembly 110 for the edge of the drapery material may be accurately set with respect to guide 109 by loosening knob 164 and positioning the guiding assembly. The setting is made by way of scale 165 on the tabling surface adjacent to gap 30 (see FIGS. 1 and 3). The scale is numbered or graduated from right to left.

On shaft 136 of roller 134 is a sprocket wheel 133 which is driven by way of sprocket chain 135, passing over sprocket wheel 130 which is on shaft 129 of rollers 126 and 128.

Additional hold down rollers are provided which are adjustably carried by guide member 109. One of these hold down rollers 170 is shown in detail in FIGS. 6 and 7. Its shaft is designated at 171, the roller being supported in a bracket formed of side members 173 and 174 and a transverse member 176. Numeral 180 designates a block member which is movable between channel members 111 and 113. It is secured to U-shaped member 182 having legs 183 and 184 which carry rollers 185 and 186 on arbors carried by the legs. These rollers are in a position underneath the top flanges of channel members 111 and 113 as shown. Block member 180 is attached to transverse member 176 of the mounting for roller 170 by way of a bolt 190 with springs 191 and 192 interposed between transverse member 176 and block 180. The ends of the springs are situated in suitable spring retainers. The springs normally act on the support for roller 170 to urge it against the drapery material passing through the machine. The position of the hold down roller may be easily adjusted simply by grasping the mounting of roller 170 and urging the roller away from the drapery material, thus which allows rollers 185 and 186 to roll freely with respect to the flanges on channel members 111 and 113 so that support means 180–182 can be moved along guide assembly 110 to a new position.

Numeral 196 designates another roller like hold down roller 170 similarly supported from guide member 109.

As previously stated, a stiffening strip such as buckram applied at the right end of the machine and the laminations of drapery and buckram material which embodies adhesive are sealed together by any means which in the exemplary form of the invention are in the form of a heated roller. The edge of the drapery material passes underneath folding plate 98, and it is folded over this plate and then passes between two sets of rollers, one set of which is carried by a pivoted frame, and this set of rollers can be lifted away from the other set positioned near the edge of the material to pass between them. This particular construction will be described presently.

The heated sealing roller 200 is mounted for vertical movement, being movable downwardly to a position to seal the laminations. Referring to FIGS. 1 and 2, supported on platform members 66 are pedestals 202 and 204 for pedestal bearings 206 and 208 in which are journalled ends of shaft 210. Pivotally mounted on this shaft is rectangular frame 214 having side members 216 and 218. At the front end of these side members are suspension members 220 and 222. Journalled between the ends of these members is shaft 226 of heated sealing roller 200. Heat is applied to an electrical heater in the drum by way of rotary commutator contact discs as may be seen at 231 and contact strips 232 connected to a suitable source of power.

The opposite ends of the side members 216 and 218 of frame 214 are attached to yoke 238 having suspending rod 240 on which are a group of weights 242 which act as a counterbalance, counter-balancing the weight of the heated roller 200. On shaft 226 of the heating roller is a gear 243. When the heating roller is lowered for a position of sealing, this gear meshes with another gear so that the heating roller is driven (rotated) while performing its sealing function. This mechanism will be described more in detail presently.

Figure 10:
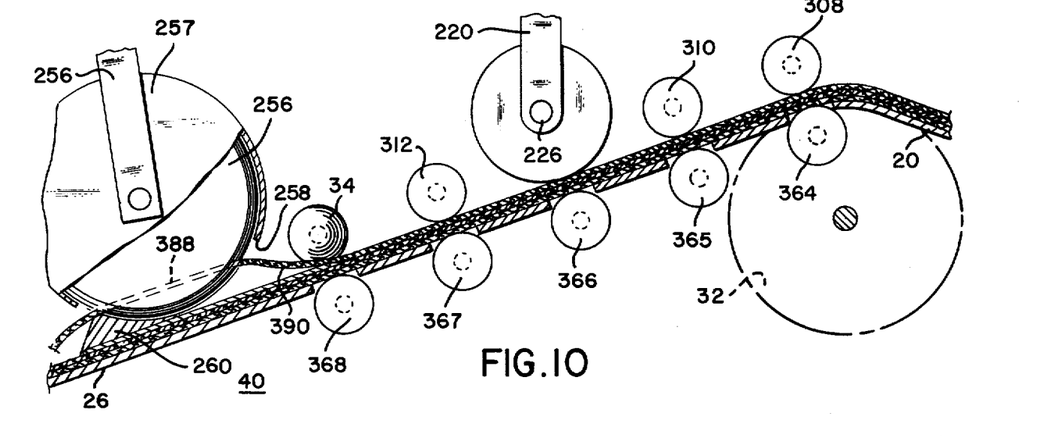
FIG. 10 is a sectional view taken along the line 10—10 of FIG. 8.
Figure 11:
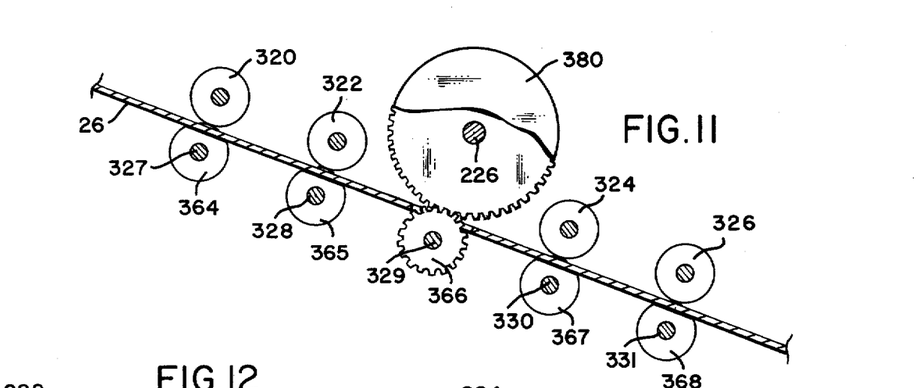
FIG. 11 is a sectional view taken along the line 11—11 of FIG. 8.
Figure 12:
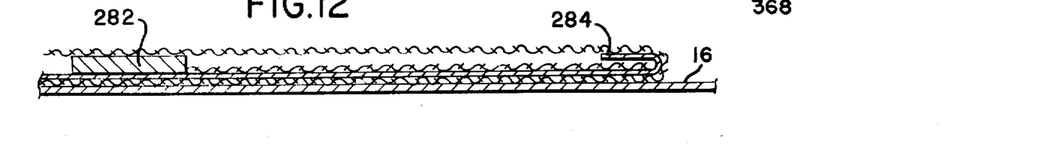
FIG. 12 is a sectional view taken along the line 12—12 of FIG. 8.

Numeral 250 as may be seen in FIG. 1 designates a yoke member having legs 251 and 252 which are journalled on shaft 210. Numeral 256 as may be seen in FIG. 2 is a support member attached to member 250 and on which is journalled the rotary cutting wheel 256 which is in a circular protective housing or shield 257 having a gap 258 in it as shown in FIG. 10. Numeral 390 designates a guide ramp guiding the excess edge part of the drapery material which is to be cut off.

Numeral 268 designates a steam generator having a water glass 269. It has an outlet conduit 270 with manual valve 272 and an automatic electric control valve 274 controlling a flexible discharge line 276 which connects to a roller 277 for applying moisture to the laminations of the drapery stiffener material which are sealed together for activating the adhesive.

As previously pointed out, on the edge part of the drapery material which is being processed, there is a strip of stiffening material bonded to it. The edge of the drapery material is folded over the stiffening material and bonded thereto. The mechanism for performing this processing is best shown in FIGS. 1, 2, and 9–13. Plate 98 as seen in FIG. 1 overlies the table surface, and the drapery passes between the table surface and this plate. Then, the edge of the drapery material is folded over the edge of this plate as indicated at 102 in FIG. 1. The strip of stiffening material passes over plate 98 under the folded over edge part 102.

Figure 8:
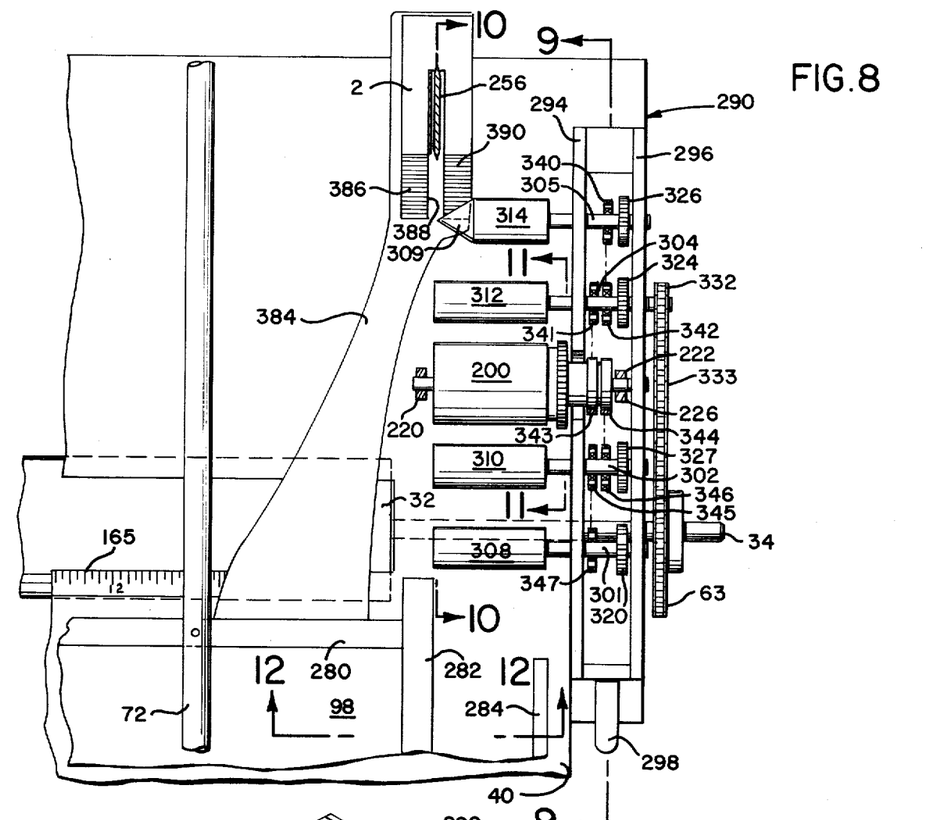
FIG. 8 is an enlarged plan view, partly in section of the right hand part of the machine.
Figure 9:
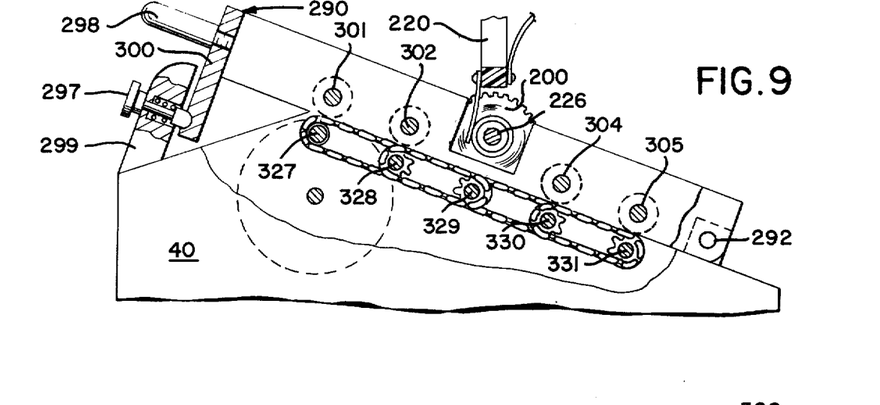
FIG. 9 is a sectional view taken along the line 9—9 of FIG. 8.

Numerals 280 and 281 designate transverse ribs or braces above plate 98 which are secured to column members 76 and 78. This part of the machine is shown in the enlarged view, FIG. 8 which is taken along line 8—8 of FIG. 2. Numeral 282 indicates a member which is on or above plate 98 and which provides a guide for the left edge of stiffening tape 100, the right edge of which is guided by channel member 284 as may be seen in FIG. 8. The edge part of the drapery which has been folded over stiffening tape 100 passes between two sets of substantially tangent rollers. There is a roller which is supplied with steam, the condensation of which furnishes moisture for moistening the adhesive to activate it. The upper set of rollers includes an electrically heated roller for sealing the laminations of drapery and stiffening tape which contains the adhesive. The two sets of tangent rollers may be seen in FIG. 2. The upper set of rollers will be described first, after which the lower set will be described. The upper set of roller is carried by a rectangular frame 290 as seen in FIGS. 8 and 9. This frame is pivoted to housing 40 on pivot 292. It has side members 294 and 296 and a manipulating handle 298. The manipulating handle is attached to end member 300 of the frame. The position of frame 290 is above housing 40 previously referred to.

Numeral 297 designates a spring detent plunger extending through bracket 299 extending from housing 40 whereby bracket 300 of frame 290 can be latched in its operative position.

Journalled in the side members of frame 296 are shafts 301, 302, 304 and 305. On shaft 301 is a cylindrical roller 308. On shaft 302 is a cylindrical roller 310. On shaft 304 is a cylindrical roller 312, and on shaft 305 is a pointed cylindrical roller 314. On shaft 301 between side frames 294 and 296 is a gear 320. On shaft 302 is a similar gear 322. On shaft 304 is a similar gear 324; and on shaft 305 is a similar gear 326 (see FIG. 11).

Figure 13:
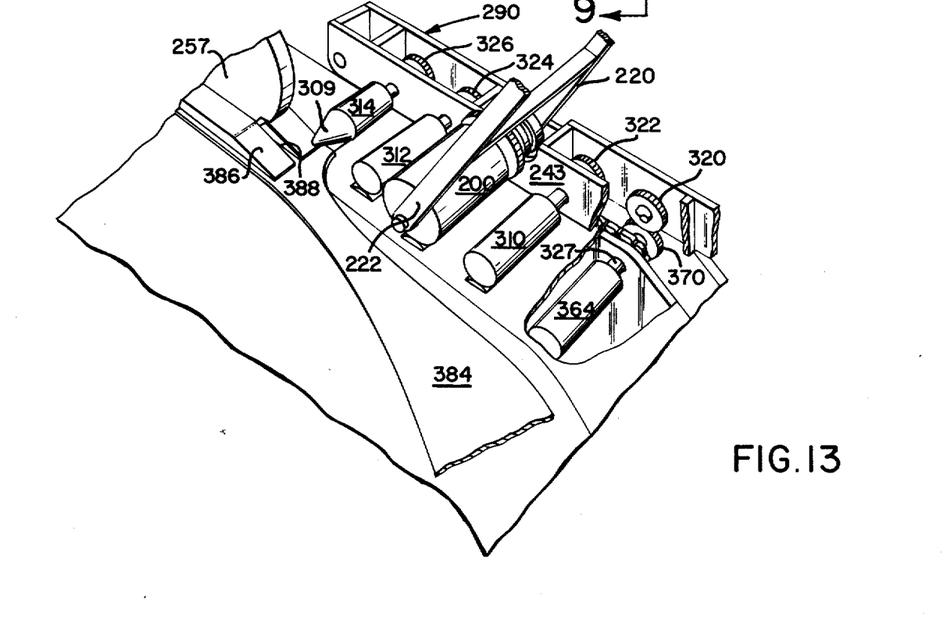
FIG. 13 is a partial perspective view of the roller assemblies between which the laminations of drapery fabric and stiffener material pass.

Mounted below rollers 320–326 at predetermined spacing is a set of five rollers as will be described on shafts 327, 328, 329, 330, and 331 extending from the wall of housing 40 (see FIG. 13). On shaft 330 is a sprocket wheel 332 which is driven by sprocket chain 333 passing over sprocket wheel 63 previously described which is on shaft 34 of drum 32 and therefore operates synchronously therewith. On shaft 331 is a sprocket wheel 340. On shaft 330 are sprocket wheels 341 and 342. On shaft 329 are sprocket wheels 343 and 344. On shaft 328 are sprocket wheels 345 and 346. On shaft 327 is sprocket wheel 347. Shaft 330 is driven as described. Sprocket wheel 342 drives sprocket wheel 340 through a sprocket chain. Sprocket wheel 341 drives sprocket wheel 343 through a sprocket chain. Sprocket wheel 344 drives sprocket wheel 346 through a sprocket chain. Sprocket wheel 345 drives sprocket wheel 347 through a sprocket chain. All of the lower cylindrical rollers are driven in synchronism with shaft 34 of drum 32.

The lower set of rollers are all cylindrical rollers of the same size carried on the shafts extending from the end wall of housing 40 having a position as may be seen in FIGS. 9, 10, 11 and 13, the rollers being designated at 364, 365, 366, 367, and 368. Rollers 364, 365, 367 and 368 are spaced from rollers 320, 322, 324, and 326 carried by frame 290 and positioned so that the laminations of drapery and stiffener strip can pass between the rollers. On the shafts of the lower rollers are gears 370, 371, 372, 373, and 374. As previously explained, all of these shafts are driven by shaft 34 as described and when frame 290 is in position, its gears 320, 322, 324, and 326 come into meshing relationship with gears 370, 371, 373, and 374. The upper set of rollers is driven in this manner. The laminations of fabric and tape pass between the two sets of rollers.

On shaft 226 of heating roller 200 is a gear 380. When this roller is lowered in the manner described above to apply heat to the laminations of drapery fabric and tape, gear 380 comes into mesh with gear 372 on shaft 329 which is driven in the manner described above so that the heating roller is driven as well. The relationship of these gears is illustrated in FIGS. 9–13.

As may be seen, the surface 26 (FIG. 10) has slot openings to receive peripheries of the lower array of rollers.

As may be observed, the suspension of the cutting rotor is pivotal so that it has a floating relationship relative to the tabling surface. Referring to FIG. 8, numeral 384 designates a flexible strip of material which extends rearwardly from base member 280 having a shape as shown and which extends to shoe 386 carried at the lower part of shield 257 of cutter wheel 256. Shoe 386 has a slot 388 and its front edge is formed as a ramp 390 as may be seen in FIGS. 8 and 10. Excess fabric which is to be cut off passes over flexible plate 384 with this plate coming between the folded over part and the part which is below it. This edge part is guided by tapered end 309 of roller 314 and ramp 390 so that it is accurately cut off by the rotary cutter 256.

OPERATION

From an understanding of the usage and operation of the machine, it will be appreciated how it greatly simplifies the tasks of tabling and sizing drapery and greatly reduces the amount of space required for this operation. At the same time, it minimizes the personnel required.

As previously set forth, the drapery material is tumbled from basket 14 over the tabling surface and processed drapery is then tumbled (passed) into basket 16 in the back of the machine. The operator stands in front of the machine and at the start, brings the drapery up in to be sized (measured) and the one edge processed. One edge of the drapery material which will be the bottom edge of the finished drape is placed against angle member 118 (see FIG. 5). Assembly 110 with its rollers and plate 124 is adjusted for sizing the drapery for the correct setting on scale 165, which as pointed out, is a measurement of the correct length of the finished drapery. Scale 165 is positioned and graduated so that assembly 110 will fix an exact measure of drapery length from the top folded over edge which is to be processed by having stiffener material applied.

The drapery material passes underneath the hold down and guide rollers 170 and 196. The mounting of these rollers is adjustable. They can be lifted as described and then moved longitudinally along guide channel member 109.

The right edge part of the drapery material which will be the top of the drapery passes underneath plate assembly 98 as may be seen in FIGS. 1 and 8, and the strip of buckram material 100 is brought up over the ramp between guide members 282 and 284 and the edge part of the drapery material is folded back to the left over stiffening material 100. The laminations of drapery and stiffener strip pass between the two sets or arrays of rollers; moisture is applied; and then heat to activate the adhesive in the strip, all rollers being driven. The excess drapery is separated and cut off by the rotary cutter.

In this manner, the drapery material is tumbled through the machine over the table and rotating drum, at all times being held down and guided in exact accordance with the setting of assembly 110. The operator merely has to assist in the folding over of the edge of the material, allowing it to be guided into the stiffener applying apparatus. In operation, heated roller 200 is applied to the laminations of drapery material and the stiffening material. The heat applied serves to cause the impregnated adhesive in the stiffener material to bond the edge laminations together. The excess material is cut off and guided away as already described.

The drapery material is driven smoothly and evenly without derivation from straight movement so the accuracy of width is maintained. This is achieved by the driving of the drapery across the width and particularly by the driving rollers both above and below the material.

From the foregoing, those skilled in the art will understand the nature and construction of the invention and the manner in which it achieves and realizes all of the objects and advantages as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. A machine for tabling and sizing fabric material comprising: means providing a tabling surface, on which the material is tumbled from one side to the opposite side of the surface means; said surface means having a gap with an elongated cylindrical driven roller means having a part of its surface in the gap; means adjacent one end of the roller means for applying a flat stiffener strip on the edge part of the material, and means overlying the surface means and extending along the surface means transversely to the direction of movement for guiding and holding the fabric material while transversing the surface means, said overlying means including means for holding down the fabric and for accurately positioning and guiding the opposite edge part of the material whereby to accurately establish an overall dimension of finished fabric material processed by the machine.

2. A machine as in claim 1, wherein said overlying means comprises adjustable means adapted to engage and provide a stop for the other edge of the fabric material whereby to cause said one edge to accurately traverse the moving surface means, said holding down means comprising laterally adjustable roller means engaging the fabric material.

3. A machine as in claim 2, including measuring and indicating means for indicating a set position of said adjustable means.

4. A machine as in claim 1, wherein said processing means comprises apparatus for accurately guiding and holding said first edge part of the fabric material passing through the machine.

5. A machine as in claim 1, including a strip of stiffening material impregnated with adhesive and apparatus for applying heat to laminations of folded over fabric material and stiffener material for causing the adhesive to bond the laminations to bond together.

6. A machine as in claim 5, including applicator means for applying heat to the laminations comprising a heated pressure roller for applying heat and pressure.

7. A machine as in claim 6, including a pivotally mounted member carrying said applicator adapted for movement to lift the applicator away from the fabric.

8. A machine as in claim 5, wherein said guide mechanism comprises upper and lower roller means positioned to have said laminations pass between them.

9. A machine as in claim 8, including cutting means associated with the adhesive bonding means for cutting off an excess part of the fabric material.

10. A machine as in claim 8, including means for driving said upper and lower roller means.

* * * * *